US005491770A

United States Patent [19]
Bonafini, Jr.

[11] Patent Number: 5,491,770
[45] Date of Patent: Feb. 13, 1996

[54] COPOLYMERS FOR OPTICAL FIBERS

[76] Inventor: James A. Bonafini, Jr., 77 Pratt St., Lunenburg, Mass. 01887

[21] Appl. No.: 394,682

[22] Filed: Feb. 24, 1995

[51] Int. Cl.⁶ .............................. G02B 6/00; C08F 120/18
[52] U.S. Cl. ........................ 385/145; 385/141; 385/143; 385/144; 385/142; 526/329.7
[58] Field of Search .................................... 385/141, 142, 385/143, 144, 145; 526/329.7, 242; 525/330.3

[56] References Cited

U.S. PATENT DOCUMENTS

| | | | |
|---|---|---|---|
| 4,238,575 | 12/1980 | Kleiner et al. | 525/212 |
| 4,544,235 | 10/1985 | Nishida | 385/141 X |
| 4,547,040 | 10/1985 | Yamamoto | 385/141 X |
| 4,593,974 | 6/1986 | Yamamoto | 385/141 X |
| 4,707,076 | 11/1987 | Skutnik | 385/141 X |
| 4,740,055 | 4/1988 | Kanda | 385/141 X |
| 4,783,135 | 11/1988 | Utsumi | 385/141 X |
| 4,798,445 | 1/1989 | Yumamoto | 385/141 X |
| 4,812,011 | 3/1989 | Tatsukami et al. | 385/143 X |
| 4,889,894 | 12/1989 | Siol et al. | 525/227 |
| 4,996,275 | 2/1991 | Ellis | 526/245 |
| 5,023,123 | 6/1991 | Siol et al. | 428/392 |
| 5,076,659 | 12/1991 | Bekiarian et al. | 385/143 |
| 5,113,477 | 5/1992 | Eguchi | 385/143 |
| 5,155,796 | 10/1992 | Oonishi | 385/143 |
| 5,179,171 | 1/1993 | Minami et al. | 525/288 |
| 5,198,925 | 3/1993 | Heumuller et al. | 359/356 |
| 5,302,316 | 4/1994 | Hashimoto | 252/183.11 |

OTHER PUBLICATIONS

Deckers, H. A., Dittmer, T., Fuss, R. W., Stern, R., "Applications of Fluoropolymers in Optical Fibres," *Fluoropolymers Conference* 1992. (No Month).

*Primary Examiner*—Brian Healy
*Attorney, Agent, or Firm*—Craig E. Larson; John E. Thomas

[57] ABSTRACT

A copolymer for optical fiber applications is the polymerization product of a mixture comprising a fluorinated itaconate and an alkyl (meth)acrylate.

9 Claims, No Drawings

COPOLYMERS FOR OPTICAL FIBERS

BACKGROUND OF THE INVENTION

The present invention relates to copolymers for optical fiber applications.

Optical fibers are generally composed of a core and a cladding surrounding the core. It is required that the core and cladding materials have desirable optical properties, as well as suitable physical properties to permit processing of the fibers. An example of a core material having desired optical properties (including high light transmission and a high refractive index) and physical properties is polymethylmethacrylate (PMMA). One class of optical fibers having a PMMA core include a cladding material formed of a fluorinated (meth)acrylate, such as trifluoroethyl methacrylate, or copolymers thereof.

Applicant has found a class of copolymers that are useful as a cladding material for optical fibers. The class of materials exhibit desirable optical properties and processing advantages over conventional cladding materials.

SUMMARY OF THE INVENTION

The invention relates to a copolymer for optical fiber applications that is the polymerization product of a mixture comprising a fluorinated itaconate and an alkyl (meth)acrylate. Additionally, the invention relates to an optical fiber comprising the copolymer as an optical cladding, or as a optical fiber core.

DETAILED DESCRIPTION OF PREFERRED EMBODIMENTS

The invention provides an optical cladding formed of a copolymer that is the polymerization product of a mixture comprising a fluorinated itaconate, and an alkyl (meth)acrylate.

Preferred itaconates are represented by the formula:

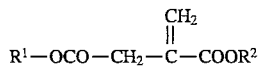

wherein $R^1$ and $R^2$ are independently selected from the group consisting of hydrogen and an organic radical, provided that at least one of $R^1$ and $R^2$ is an organic fluorine-containing radical.

Representative organic radicals include: straight or branched $C_1$–$C_{18}$ alkyl groups; $C_5$–$C_{18}$ cycloalkyl groups; $C_2$–$C_{18}$ alkenyl groups; $C_6$–$C_{18}$ aromatic groups; $C_7$–$C_{18}$ alkylaryl groups; and $C_6$–$C_{18}$ alkylcycloalkyl groups. Representative organic fluorine-containing radicals include: straight or branched $C_1$–$C_{18}$ fluoroalkyl groups; $C_5$–$C_{18}$ fluorinated cycloalkyl groups; $C_2$–$C_{18}$ fluorinated alkenyl groups; $C_6$–$C_{18}$ fluorinated aromatic groups; $C_7$–$C_{18}$ fluorinated alkylaryl groups; and $C_6$–$C_{18}$ fluorinated alkylcycloalkyl groups.

Preferred itaconates are those that include a relatively high degree of fluorination. For example, fluorinated itaconates wherein both $R_1$ and $R_2$ are an organic fluorine-containing radical ensure a relatively high degree of fluorination. Additionally, itaconates wherein at least one of $R_1$ and $R_2$ includes a trifluoromethyl radical or a perfluoroalkyl radical (such as 2,2,2-trifluoroethyl or hexafluoro-isopropyl radicals) provide a relatively high degree of fluorination. Especially preferred fluorinated itaconates include bis(2,2,2-trifluoroethyl) itaconate and bis(1,1,1,3,3,3-hexafluoro-2-propyl) itaconate.

The alkyl (meth)acrylate is preferably a $C_1$–$C_6$ alkyl (meth)acrylate, such as: methyl methacrylate, methyl acrylate, ethyl methacrylate, ethyl acrylate, n-butyl methacrylate, n-butyl acrylate, t-butyl methacrylate and t-butyl acrylate.

Preferably, the copolymer includes between about 50 to about 90 weight % of the fluorinated itaconate, more preferably about 65 to about 80 weight %. Amounts outside the preferred ranges tend to lead to copolymers having undesirable optical or physical properties, or may lead to copolymers that are difficult to process into optical fibers. Also, it is preferred that the copolymer includes between about 10 to about 50 weight % of the alkyl (meth)acrylate, more preferably about 20 to about 35 weight %.

Fluorinated (meth)acrylates, such as trifluoroethyl methacrylate, have been proposed for use as a primary comonomer for optical cladding copolymers. However, it has been found that fluorinated itaconates offer practical advantages over fluorinated (meth)acrylates. First, fluorinated itaconates tend to be more rigid than fluorinated (meth)acrylates. Second, the optical properties of both fluorinated (meth)acrylates and fluorinated itaconates are influenced by the degree of fluorination. Since fluorinated itaconates are diesters and can have a higher fluorine content than fluorinated (meth)acryates, lower ratios of the fluorinated itaconate comonomer, and higher ratios of the alkyl (meth)acrylate comonomer, can be used as the optical cladding copolymer. In turn, due to the higher ratio of the alkyl (meth)acrylate comonomer, it is believed that the inventive optical cladding copolymer is more compatible with a core formed of an alkyl (meth)acrylate (such as PMMA), providing for improved adhesion between the core and cladding.

The copolymer may be formed from other comonomers generally known in the art. Representative optional comonomers include: fluorinated (meth)acrylates, such as trifluoroethyl methacrylate or trifluoroethyl acrylate; cycloalkyl (meth)acrylates, such as cyclohexyl methacrylate or cyclohexyl acrylate; aryl (meth)acrylates, such as phenyl methacrylate, phenyl acrylate, or benzyl methacrylate; (meth) acrylic acids, such as methacrylic acid or acrylic acid; and styrene containing monomers.

As mentioned, the copolymers are particularly suited as optical cladding for use with core materials formed of an alkyl (meth)acrylate, for the advantages discussed above, although it is within the scope of the invention to employ the optical cladding with other known core materials.

As known in the art, a cladding copolymer should be selected so that its refractive index (n1) is slightly lower than the refractive index (n2) of the core material, and more preferably n2−n1=0.01 to 0.15. Accordingly, for a core formed of PMMA having a refractive index of about 1.49, the cladding copolymer will generally have a refractive index of about 1.34 to 1.48. For cores formed of materials other than PMMA, one skilled in the art can readily ascertain specific copolymers having the desired refractive index.

If desired, the fibers, including the core material and the cladding material of the invention, may further include an outer protective coating. As known in the art, it is preferred that the protective coating is selected so that its refractive index is slightly lower than that of the cladding copolymer.

A preferred manner of making fibers involves co-extrusion of the core and optical cladding. According to methods known in the art for the spinning of fiber optic cable, two extruders are employed, one being for the core material and the other for the cladding. These extruders feed a concentric bicomponent die which forms the optical fiber. Subsequently the fiber enters a cooling bath and a drawing oven to produce a fiber of the proper diameter.

The following examples illustrate various preferred embodiments.

Copolymers were polymerized from the ten monomeric mixtures listed in the following tables, wherein the amounts of the individual components are given in weight percent. The mixtures were placed in cylindrical tubes, and the tubes were deoxygenated and sealed. The mixtures were polymerized with heating in a water bath. The resultant polymerized rods were cut into 0.5-mm thick disks. The disks were used for refractive index measurements and qualitative clarity and stiffness evaluations. The results are summarized in the tables.

| Monomers | 1 | 2 | 3 | 4 | 5 |
|---|---|---|---|---|---|
| TFEI | 50 | 75 | 70 | 50 | 40 |
| MMA | 50 | 25 | 30 | 20 | 50 |
| BHI | | | | 30 | 10 |
| AIVN | 0.054 | 0.054 | 0.054 | 0.054 | 0.054 |
| AIBN | 0.17 | 0.17 | 0.17 | 0.17 | 0.17 |
| Clarity | clear | slightly hazy | slightly hazy | hazy | clear |
| Refractive Index | 1.4499 | 1.4277 | 1.4325 | | 1.4472 |
| Stiffness | stiff | stiff | stiff | soft | stiff |

| Monomers | 6 | 7 | 8 | 9 | 10 |
|---|---|---|---|---|---|
| TFEI | 55 | 55 | 55 | 60 | 65 |
| MMA | 25 | 30 | 35 | 40 | 35 |
| BHI | 20 | 15 | 10 | | |
| AIVN | 0.054 | | | | |
| AIBN | 0.17 | | | | |
| Clarity | hazy | slightly hazy | clear | clear | clear |
| Refractive Index | 1.4174 | 1.4271 | 1.433 | 1.4431 | 1.4362 |
| Stiffness | stiff | stiff | stiff | stiff | stiff |

TFEI — bis-trifluoroethyl itaconate
MMA — methyl methacrylate
BHI — bis(1,1,2,2,3,3 -hexafluoroisopropyl) itaconate
AIVN — 2,2-azobisisovaleronitrile (initiator)
AIBN — 2,2-azobisisobutyrisonitrile (initiator)

The data demonstrates that copolymers having a variety of optical and physical properties can be tailored by varying the ratio and types of monomers. The copolymers that were ranked as "hard", and either "clear" or "slightly hazy", are considered suitable for optical fiber applications. As an example, the copolymers of Examples 2 and 7 are especially suitable as a cladding for a PMMA core.

Although the above description has emphasized the use of the fluorinated itaconate copolymers as an optical cladding material, it is within the scope of the invention to employ this copolymer as the core material. As an example, for a cladding formed of PMMA (having refractive index of about 1.49), a core formed of the fluorinated copolymer should have a refractive index of about 1.50 to 1.64.

Although certain preferred embodiments have been described, it is understood that the invention is not limited thereto and modifications and variations would be evident to a person of ordinary skill in the art.

I claim:

1. An optical cladding formed of a copolymer that is the polymerization product of a mixture comprising a fluorinated itaconate, and an alkyl (meth)acrylate.

2. The optical cladding of claim 1, wherein the mixture includes a fluorinated itaconate containing a trifluoromethyl radical or a perfluoroalkyl radical.

3. The optical cladding of claim 2, wherein the mixture includes at least one member selected from the group consisting of bis(2,2,2-trifluoroethyl) itaconate and bis(1,1,1,3,3,3-hexafluoro-2-propyl) itaconate.

4. The optical cladding of claim 1, wherein the mixture includes a $C_1$–$C_6$ alkyl methacrylate.

5. The optical cladding of claim 4, wherein the mixture includes at least one member selected from the group consisting of methyl methacrylate, ethyl methacrylate and butyl methacrylate.

6. The optical cladding of claim 1, wherein the mixture comprises about 50 to about 90 weight percent of the fluorinated itaconate, and about 10 to about 50 weight percent of the alkyl (meth)acrylate.

7. The optical cladding of claim 1, wherein the mixture comprises at least one member selected from the group consisting of bis(2,2,2-trifluoroethyl) itaconate and bis(1,1,1,3,3,3-hexafluoro2-propyl) itaconate, and at least one $C_1$–$C_6$ alkyl methacrylate.

8. An optical fiber comprising a core formed of polymethylmethacrylate, and a cladding formed of a copolymer that is the polymerization product of a mixture comprising a fluorinated itaconate and an alkyl (meth)acrylate.

9. An optical fiber core formed of a copolymer that is the polymerization product of a mixture comprising a fluorinated itaconate and an alkyl (meth)acrylate.

* * * * *